United States Patent
Wynne

(10) Patent No.: US 10,335,873 B2
(45) Date of Patent: Jul. 2, 2019

(54) PORTABLE MITER SAW ACCESSORY

(76) Inventor: Ronald Wynne, Kihei, HI (US)

( * ) Notice: Subject to any disclaimer, the term of this patent is extended or adjusted under 35 U.S.C. 154(b) by 91 days.

(21) Appl. No.: 13/012,152

(22) Filed: Jan. 24, 2011

(65) Prior Publication Data

US 2012/0186412 A1    Jul. 26, 2012

(51) Int. Cl.
  *B27B 5/29* (2006.01)
  *B23D 45/04* (2006.01)
  *B23D 47/04* (2006.01)

(52) U.S. Cl.
  CPC .......... *B23D 45/044* (2013.01); *B23D 47/04* (2013.01); *B27B 5/29* (2013.01); *Y10T 83/04* (2015.04); *Y10T 83/7613* (2015.04); *Y10T 83/7693* (2015.04)

(58) Field of Classification Search
  CPC ........ B23D 45/044; B23D 47/04; B27B 5/29; Y10T 83/04; Y10T 83/7613; Y10T 83/7693; A47B 1/04
  USPC ....... 144/287, 286.1; 16/262, 381; 83/471.3, 83/473, 490, 581, 472, 474, 477, 467.1, 83/468.5, 468.6, 468.7
  See application file for complete search history.

(56) References Cited

U.S. PATENT DOCUMENTS

| | | | | |
|---|---|---|---|---|
| 131,989 A * | 10/1872 | Andre | | 108/35 |
| 348,462 A * | 8/1886 | Hall | | 108/25 |
| 484,965 A * | 10/1892 | Jordan | | A47B 1/04 108/80 |
| 510,858 A * | 12/1893 | Hastings | | 108/160 |
| 1,375,212 A * | 4/1921 | Crone | | 16/366 |
| 1,658,826 A * | 2/1928 | Yerk et al. | | 451/411 |
| 2,465,000 A * | 3/1949 | Turner | | 83/473 |
| 2,990,862 A * | 7/1961 | Ruben | | 144/285 |
| 4,640,326 A * | 2/1987 | Hewitt | | 144/287 |
| 4,798,113 A * | 1/1989 | Viazanko | | 83/471.3 |
| 4,874,025 A * | 10/1989 | Cleveland | | 144/287 |
| 5,033,161 A * | 7/1991 | Chavez | | B25B 27/04 16/254 |
| 5,067,535 A * | 11/1991 | Wolff | | 144/286.1 |
| 5,115,847 A * | 5/1992 | Taber | | 144/287 |
| 5,375,296 A * | 12/1994 | Zaleskie | | E05D 5/04 16/237 |
| 5,549,051 A * | 8/1996 | Zimmerman | | A47B 1/04 108/80 |
| 6,474,207 B1 * | 11/2002 | Itzov | | 83/471.3 |
| 6,948,539 B1 * | 9/2005 | Barker | | B23D 47/025 144/285 |

(Continued)

OTHER PUBLICATIONS

Horton, Lamar, Wooden Miter Saw Stand, Jun. 18, 2010, avaiable on Nov. 16, 2017: http://www.thisiscarpentry.com/2010/06/18/wooden-miter-saw-stand/.*

*Primary Examiner* — Jonathan G Riley

(74) *Attorney, Agent, or Firm* — Lyman Smith

(57) ABSTRACT

An alignment device for a portable motorized miter saw may allow a user to easily reproduce cuts of the same length, even when the miter saw is taken off and replaced back on a portable miter saw stand. The alignment device includes a three piece connector that allows for easy set-up of wings on either side of the saw, which are used to support the material being cut. Because the wings attach directly to the saw itself, the wings stay in exactly the same relationship to the saw blade. Thus, when a stop is attached to the wing, material can be cut to the same size lengths, even though the saw may be taken down one day and set up another day.

9 Claims, 3 Drawing Sheets

(56) References Cited

U.S. PATENT DOCUMENTS

| | | | |
|---|---|---|---|
| 7,845,745 B2* | 12/2010 | Gorz et al. | 312/401 |
| 8,122,802 B2* | 2/2012 | Lacy | B23D 47/02 |
| | | | 83/438 |
| 8,752,459 B1* | 6/2014 | Koresh | B27B 9/04 |
| | | | 83/13 |
| 2005/0034783 A1* | 2/2005 | Laird | 144/286.5 |
| 2005/0217446 A1* | 10/2005 | Brazell et al. | 83/477.2 |
| 2010/0051137 A1* | 3/2010 | Layton | 144/286.5 |

* cited by examiner

PORTABLE MITER SAW ACCESSORY

BACKGROUND OF THE INVENTION

The present invention relates to a portable motorized miter accessory and, more particularly, to an accessory for a portable motorized miter saw that allows for easy set up and take down and repeated cuts of the same lengths.

Portable motorized miter saws on stands are not able to reproduce cuts of the same lengths over and over because the relationship of the saw blade and the material being cut will not be the same each time the saw is set up. A motorized saw in a shop setting, with in feed and out feed tables on either side of the saw, can reproduce the same cuts by using a combination of stops to keep the relationship of the saw blade and the material constant relative to each other. However, with conventional portable motorized miter saws, no such relationship can be maintained.

As can be seen, there is a need for an apparatus to allow a portable motorized miter saw to handle repeated cuts of the same lengths, even with the saw is taken down and re-set back up.

SUMMARY OF THE INVENTION

In one aspect of the present invention, an alignment device for a miter saw, comprises a first plate member having a plurality of holes therethrough; a second plate member adapted to be removably attached to the first plate member, the second plate member having at least two holes therethrough, wherein the plurality of holes is adapted to secure a wing to the first plate; and the at least two holes are adapted to secure the second plate to the miter saw.

In another aspect of the present invention, a portable miter saw having an alignment device, comprises a second plate member attached to a side of the miter saw; a first plate member removably attached to the second plate member; a wing attached to the first plate member; and a stop attached to the wing, the stop defining a distance away from a blade of the miter saw for material to be cut.

In a further aspect of the present invention, a method for making reproducible same-sized cuts with a portable miter saw comprises attaching a second plate directly on a side of the miter saw; attaching a first plate to the second plate, the first plate having a wing attached thereto, the wing extending away from the side of the miter saw; positioning a stop at a desired cut length away from a blade of the miter saw; placing one end of material to be cut at the stop and positioning the material under the blade of the miter saw; and cutting the material.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, an embodiment of the present invention provides an alignment device for a portable motorized miter saw. The alignment device may allow a user to easily reproduce cuts of the same length, even when the miter saw is taken off and replaced back on a portable miter saw stand. The alignment device includes a three piece connector that allows for easy set-up of wings on either side of the saw, which are used to support the material being cut. Because the wings attach directly to the saw itself, the wings stay in exactly the same relationship to the saw blade. Thus, when a stop is attached to the wing, material can be cut to the same size lengths, even though the saw may be taken down one day and set up another day.

Figure 1:
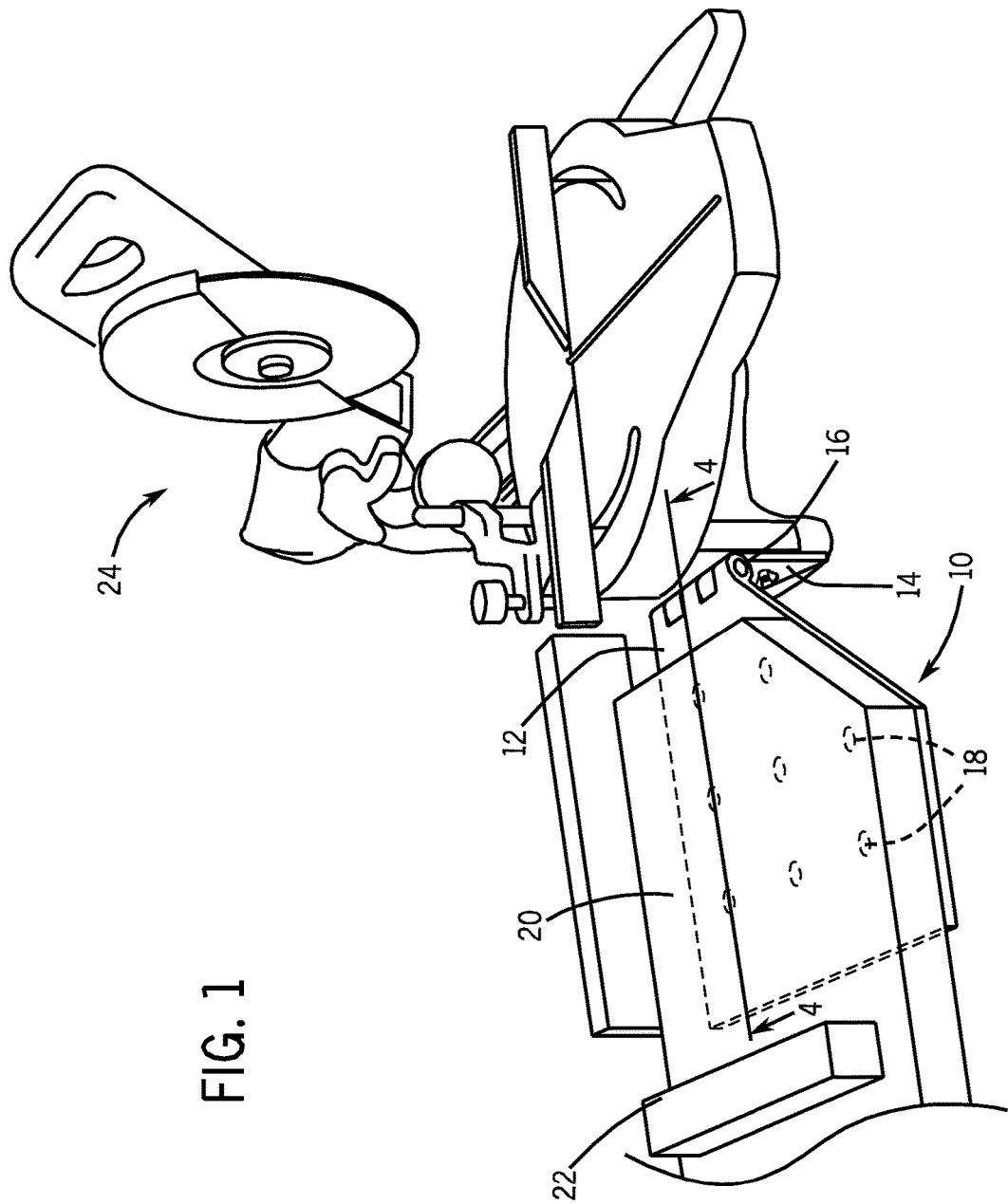
FIG. 1 is a perspective view of a portable motorized miter saw having an alignment device according to an exemplary embodiment of the present invention.
Figure 2:
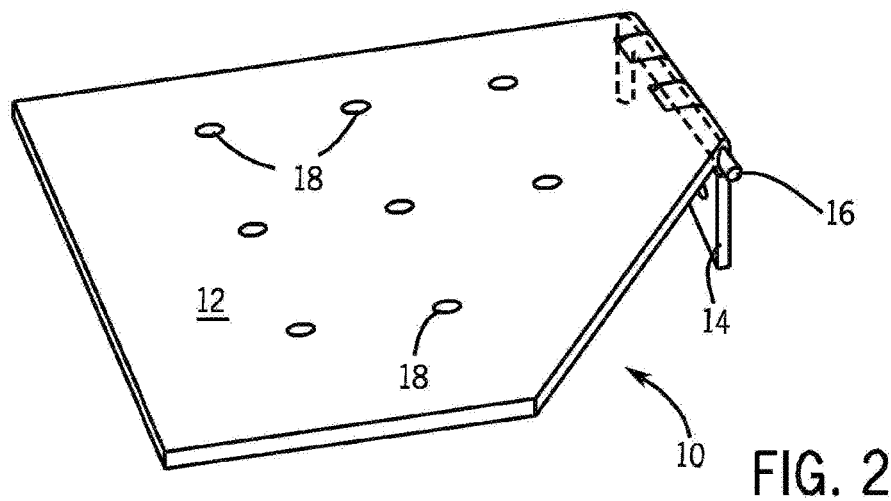
FIG. 2 is a perspective view of the alignment device of FIG. 1.
Figure 3:
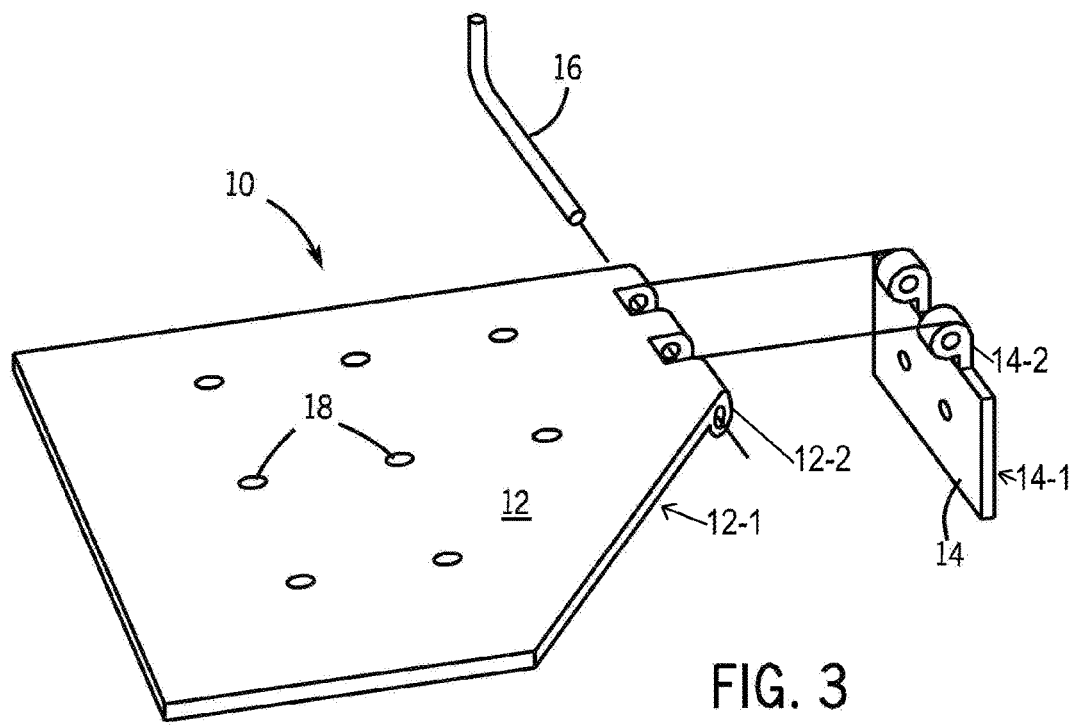
FIG. 3 is an exploded perspective view of the alignment device of FIG. 1.
Figure 4:
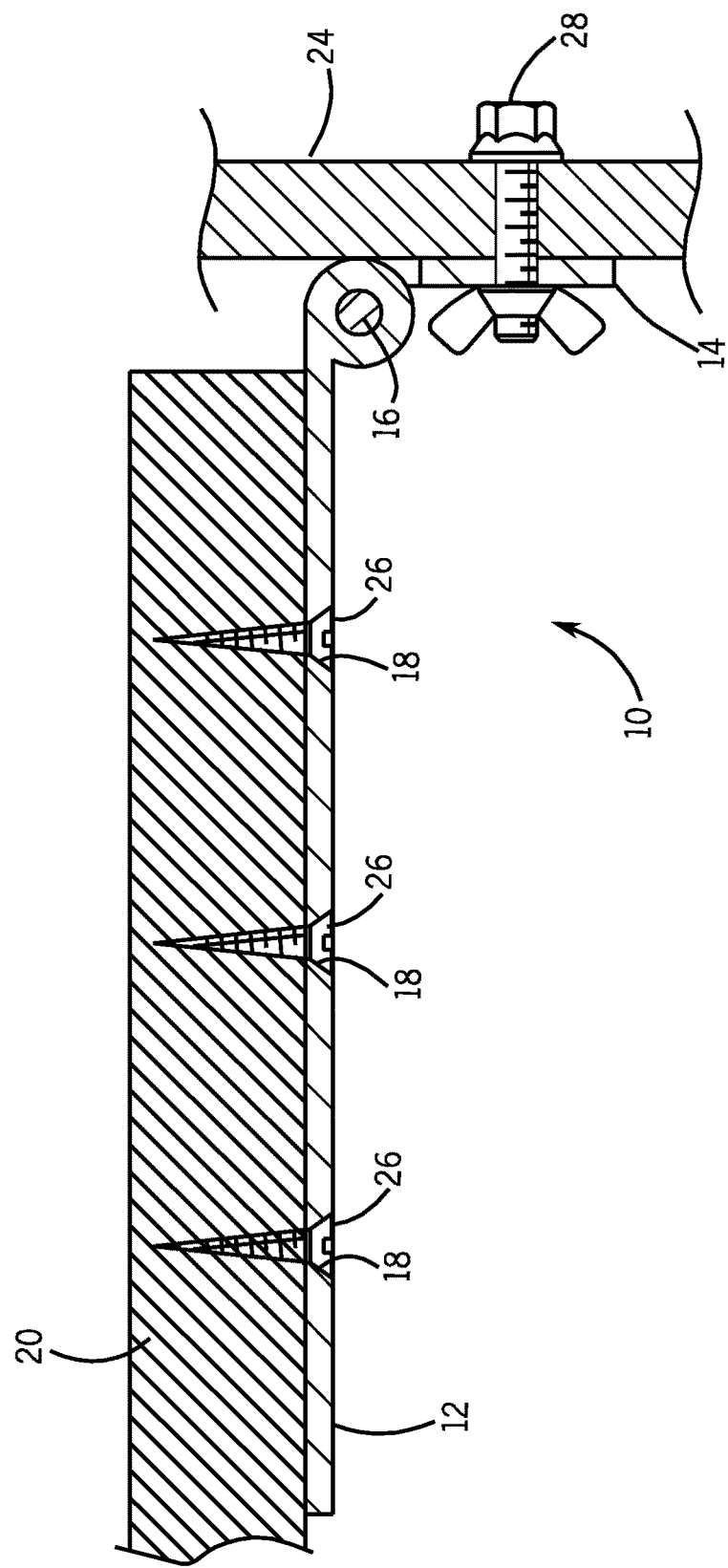
FIG. 4 is a cross-sectional view taken along line 4-4 of FIG. 1.

Referring to FIGS. 1 through 4, an alignment device may include a first plate 12 and a second plate 14, adapted to be attached to a side of a miter saw 24. The first plate 12 can include a first planar portion 12-1 and a first connection portion 12-2, while the second plate 14 can include a second planar portion 14-1 and a second connection portion 12-2. The first plate may be about ⅛ inch thick, may be from about 5 to about 9 inches square, typically about 7 inches square, with a corner cut off, typically at about a 45 degree angle. The cut off corner may be measured about 3½ inches from one corner of the square plate. The cut off corner may allow the miter saw to be swung to a 45 degree position. Therefore, the cut off corners may be positioned as shown in FIG. 1.

The first plate 12 may pivotably attach to the second plate 14. In some embodiments, a pivot pull pin 16 may attach the first plate to the second plate 14. The first plate 12 may be removed from the second plate 14 by removing the pivot pull pin 16. The second plate 14 may be, for example, about 3½ inches by about 1½ inches. The pivot pull pin may be a ¼ inch pin, having a length of about 4½ inches, bent at a 90 degree angle about 1 inch from one end. Other attachment means may be used to pivotably connect the first plate 12 to the second plate 14.

The second plate 14 may attach to a side portion of the saw 24. The second plate 14 may have at least two holes to connect the second plate 14 to the side portion of the saw 24 with bolts 28.

A wing 20 may attach to the first plate 12 by passing screws 26 through holes 18 in the first plate 12 and into the wing 20. The wing 20 may be cut to match the shape of the first plate 12 (including the cut out corner). The wing 20 may be, for example, wood, such as plywood, and may be long enough to accommodate material to be cut. A stop 22 may be attached to the wing 20. The stop 20 may provide a position to place material to be cut, thereby providing cuts of the same length, regardless of the miter saw 24 being repositioned on the miter saw stand. Because a user can provide their own wing 20, various sizes, shapes and length of the wing 20 may be used, depending on the user's needs.

As can be appreciated, the second plate 14 may be attached to the miter saw 24 so that the wing 20, when installed on the first plate 12 and the first plate 12 is attached to the second plate 14, is flush with the table of the miter saw 24.

To use the alignment device 10, a user may attach the second plate 14 on a side of the miter saw 24. A wing 20 may be attached to the first plate 12. The first plate 12 may then be attached to the second plate 14, with the surface of the wing 20 being flush with the table of the miter saw 24. Material to be cut may be measured and a stop 22 may be attached to the wing 20. Additional material to be cut the same size as the original material may be simply measured from the stop, quickly and easily, without the need for a measuring tape for subsequent cuts. Holes may be drilled in the wing 20 to allow stops 22 to be installed and removed, thereby allowing the user to have a short stop and a longer stop used with the same wing. When the user wishes to take down the saw 24, the first plate 12 may be easily removed from the second plate 14, while the second plate 14 may be retained on the side of the saw 24 for easy set-up during the next use. Similarly the wing 20 may be kept attached to the first plate 12, for easy set-up during the next use.

While the above describes the use of a single alignment device 10 attached to one side of the miter saw 24, two alignment devices 10 may be used on a single miter saw 24, one alignment device 10 on each side of the miter saw 24. This may allow for two different stopped cuts without having to remove or reposition the stop on one side of the miter saw.

It should be understood, of course, that the foregoing relates to exemplary embodiments of the invention and that modifications may be made without departing from the spirit and scope of the invention as set forth in the following claims.

What is claimed is:

1. An alignment device attached to a miter saw, the alignment device comprising:
    a first plate member having a first planar portion and a first connection portion, the first planar portion having a plurality of holes therethrough;
    a second plate member removably attached to the first plate member, the second plate member having a second planar portion and a second connection portion, the second planar portion having at least two holes therethrough;
    a wing secured to the first planar portion of the first plate member, the wing having a work surface parallel with the first planar portion, the wing having a bottom surface opposite the work surface, parallel with the work surface, the bottom surface attached to and supported by the first planar portion, wherein
    the at least two holes are adapted to secure the second plate member to the miter saw;
    the work surface of the wing configured to be flush with a table of the miter saw; and
    the first plate member having a first plate member width and a first plate member length greater than a second plate member width and a second plate member length of the second plate member, wherein
    the wing and the first plate member are square shape with a corner removed, the removed corner of the wing adapted to allow the miter saw to make 45 degree angle cuts.

2. The alignment device of claim 1, wherein the first plate member is pivotably attached to the second plate member.

3. The alignment device of claim 2, further comprising a pivot pull pin connecting the first plate member to the second plate member.

4. A portable miter saw having an alignment device, comprising:
    a second plate member attached to a side of the miter saw, the second plate member having a second planar portion and a second connection portion;
    a first plate member removably attached to the second plate member, the first plate member having a first planar portion and a first connection portion;
    a wing attached to the first planar portion of the first plate member, the wing having a work surface parallel with the first planar portion, the wing having a bottom surface opposite the work surface, parallel with the work surface, the bottom surface attached to and supported by the first planar portion; and
    a stop attached to the wing, the stop defining a distance away from a blade of the miter saw for material to be cut, wherein
    the work surface of the wing configured to be flush with a table of the miter saw; and
    the first plate member having a first plate member width and a first plate member length greater than a second plate member width and a second plate member length of the second plate member
    wherein the wing and the first plate member are square shape with a corner removed, the removed corner of the wing adapted to allow the miter saw to make 45 degree angle cuts.

5. The alignment device of claim 4, wherein the first plate member is pivotably attached to the second plate member.

6. The alignment device of claim 5, further comprising a pivot pull pin connecting the first plate member to the second plate member.

7. The alignment device of claim 4, wherein the wing and the plate member are square shape with a corner removed, the removed corner of the wing adapted to allow the miter saw to make 45 degree angle cuts.

8. A method for making reproducible same-sized cuts with a portable miter saw, the method comprising:
    attaching a second plate directly on a side of the miter saw, the second plate having a second planar portion and a second connection portion;
    attaching a first plate to the second plate, the first plate having a first planar portion and a first connection portion, the first plate having a wing attached thereto, the wing extending away from the side of the miter saw, the wing having a work surface parallel with the first planar portion, the wing having a bottom surface opposite the work surface, parallel with the work surface, the bottom surface attached to and supported by the first planar portion;
    positioning a stop at a desired cut length away from a blade of the miter saw;
    placing one end of material to be cut at the stop and positioning the material under the blade of the miter saw; and
    cutting the material, wherein
    the work surface of the wing configured to be flush with a table of the miter saw;
    the first plate member having a first plate member width and a first plate member length greater than a second plate member width and a second plate member length of the second plate member; and the wing and the first plate member are square shape with a corner removed, the removed corner of the wing adapted to allow the miter saw to make 45 degree angle cuts.

9. The method of claim 8, wherein the first plate is removably attached to the second plate with a pivot pull pin.

* * * * *